United States Patent [19]

Mansy

[11] Patent Number: 4,790,953

[45] Date of Patent: Dec. 13, 1988

[54] LIQUID HYPOCHLORITE BLEACH CONTAINING OPTICAL BRIGHTENER SOLUBILIZED BY AMINE OXIDE

[75] Inventor: Samir A. Mansy, Cincinnati, Ohio

[73] Assignee: The Proctor & Gamble Company, Cincinnati, Ohio

[21] Appl. No.: 45,242

[22] Filed: Apr. 23, 1987

Related U.S. Application Data

[63] Continuation of Ser. No. 687,115, Dec. 28, 1984, abandoned.

[51] Int. Cl.⁴ .......................... C09K 3/00; D06L 3/12

[52] U.S. Cl. ................................ 252/187.26; 252/102

[58] Field of Search ............................ 252/187.26, 102

[56] References Cited

U.S. PATENT DOCUMENTS

| | | | |
|---|---|---|---|
| 3,655,566 | 4/1972 | Robinson et al. | 252/98 |
| 3,684,722 | 8/1972 | Hynam et al. | 252/187.26 X |
| 3,767,587 | 10/1973 | Claussen et al. | 252/301.2 |
| 3,904,544 | 9/1975 | Clark et al. | 252/301.2 |
| 4,071,463 | 1/1978 | Steinhauer | 252/103 |
| 4,271,030 | 6/1981 | Brierley et al. | 252/98 |
| 4,282,109 | 8/1981 | Citrone et al. | 252/102 |
| 4,390,448 | 6/1983 | Boden et al. | 252/187.26 |
| 4,526,700 | 7/1985 | Hensley et al. | 252/187.26 X |
| 4,552,680 | 11/1985 | Hartman et al. | 252/102 |

OTHER PUBLICATIONS

Bulletin-Phorwite® BHC 766 (Mobay Chemical Corp.) Jun. 1980.

*Primary Examiner*—Matthew A. Thexton
*Attorney, Agent, or Firm*—Leonard Williamson; Richard C. Witte

[57] ABSTRACT

Aqueous hypochlorite bleach compositions containing a clear, stable optical brightener 4,4'-bis(4-phenyl-2H-1,2,3-triazol-2-yl)-2,2'-stilbenedisulfonate solubilized by amine oxide.

7 Claims, No Drawings

LIQUID HYPOCHLORITE BLEACH CONTAINING OPTICAL BRIGHTENER SOLUBILIZED BY AMINE OXIDE

This is a continuation of application Ser. No. 687,115, filed on Dec. 28, 1984, now abandoned.

FIELD OF THE INVENTION

The invention pertains to aqueous hypochlorite bleach products which contain optical brighteners.

BACKGROUND ART

Sodium hypochlorite is a highly effective bleaching agent and has long been used in conjunction with soaps and detergents to remove stains and other types of soils in the laundering of fabrics. It is generally formulated at a concentration of about 4–8% in water for sale for household use, where it is typically diluted to a concentration of about 200 ppm sodium hypochlorite for laundry bleaching.

Optical brighteners are dyes which are absorbed by fabrics and impart to the fabric an added increment of whiteness/brightness by means of their ability to absorb invisible ultraviolet radiation and re-emit it as visible radiation. Optical brighteners have been included as a component in laundry products for many years.

Most optical brighteners are subject to chemical attack by hypochlorite in solution, and their brightening effect is considerably diminished when used in conjunction with hypochlorite in laundering of fabrics. However, some optical brighteners have been developed which are resistant to hypochlorite atack.

It is desirable to formulate concentrated (typically about 3–8%) sodium hypochlorite solutions which contain bleach stable optical brighteners. Thus, if the housewife uses bleach in conjunction with a detergent which contains a brightener which is not stable to hypochlorite, a fabric brightening effect will still be obtained from the brightener present in the bleach.

Optical brighteners are generally insoluble in concentrated hypochlorite, and tend to quickly settle to the bottom of an aqueous hypochlorite product. Thus, simple addition of optical brightener to concentrated aqueous hypochlorite results in a product which must be vigorously shaken each time before use. Because of the tendency for rapid settling, even vigorous shaking before each use does not necessarily always result in the obtaining of uniform proportions of brightener and hypochlorite in each use. U.S. Pat. No. 3,393,153, Zimmerer, issued July 16, 1968, presents a solution to this problem by including in the composition a particulate material such as colloidal silica or a particulate colloidal polymeric resin which keeps the optical brightener in suspension in aqueous hypochlorite.

Commonly assigned U.S. Pat. No. 4,526,700, Hensley and Kitko, issued July 2, 1985, is directed to the formulation of aqueous sodium hypochlorite compositions containing a fine dispersion of a bleach stable optical brightener. The compositions comprise sodium hypochlorite, optical brightener, 4,4'-bis(4-phenyl-2H-1,2,3-triazol-2-yl)-2,2'-stilbenedisulfonate, certain alkylaryl sulfonate surfactants, and water. The optical brightener is present in the composition in the form of a dispersion of fibrous particles having diameters of from about 0.01 to about 1.5 microns. This type of composition is cloudy.

Commonly assigned U.S. Pat. No. 4,552,680, Hartman and O'Brien, issued Nov. 12, 1985, is directed to aqueous hypochlorite bleach compositions containing hypochlorite stable surfactants and antifoamants.

It is an object of the present invention to provide a brightened hypochlorite solution for the laundering of fabrics.

It was previously theorized that if the said optical brightener was solubilized by amine oxide, the brightener would be completely destroyed by hypochlorite attack.

It is an object of the present invention to provide a substantially clear and stable aqueous compositions containing hypochlorite and optical brighteners.

DETAILED DESCRIPTION OF THE INVENTION

In accordance with the present invention it has been surprisingly discovered that the bleach stable optical brightener 4,4'-bis(4-phenyl-2H-1,2,3-triazol-2-yl)-2,2'-stilbenedisulfonic acid (or its salts) can be solubilized with amine oxide to provide a substantially clear and stable aqueous sodium hypochlorite brightener solution. There is substantially no settling or salting out problem as in the prior art.

The compositions of the invention comprise:

(a) from about 3% to about 8% sodium hypochlorite;

(b) from about 0.025% to about 0.2% of the optical brightener;

(c) from about 0.5% to about 2% of an amine oxide selected from the group consisting of those having the formula:

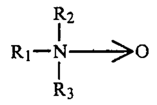

wherein $R_1$ is a $C_8$–$C_{18}$ saturated alkyl group; $R_2$ and $R_3$ are $C_1$–$C_{12}$ saturated alkyl groups.

(d) at least about 80% water;

wherein the amine oxide and brightener are present at a ratio of 40:1 to 10:1, preferably 30:1 to 20:1.

All percentages and ratios herein are "by weight" unless specified otherwise.

Sodium Hypochlorite

Typically, sodium hypochlorite is commercially available in aqueous solutions having a concentration of from about 5% to about 15%. These solutions typically contain an equimolar amount of sodium chloride. In making the compositions of the present invention it is generally desirable to add sodium hypochlorite solution to the brightener/surfactant solution in volumes such that the volume of sodium hypochlorite will be from about 0.4 to about 8 times the volume of the brightener/surfactant solution. Accordingly, the aqueous sodium hypochlorite source chosen for preparing a composition of the invention should be one which has a sodium hypochlorite concentration such that it can be mixed with the aqueous brightener/surfactant solution within these volume proportions to produce the desired amounts of sodium hypochlorite, brightener and surfactant in the finished product.

Sodium hypochlorite is present in the compositions of the invention at levels of from about 3% to about 8%, preferably from about 4% to about 7%.

Brightener

The brightener used in the compositions herein is 4,4'-bis(4-phenyl-2H-1,2,3-triazol-2-yl)-2,2'-stilbenedisulfonic acid, or its salts. The structure of the sodium salt is:

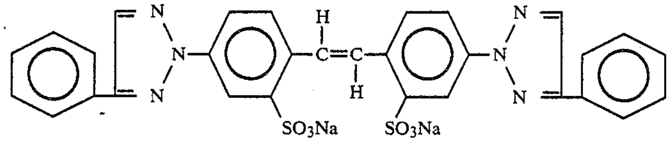

This optical brightener is available from Mobay Chemical Corporation, a subsidiary of Bayer AG, under the name Phorwite® CNA.

The optical brightener is present in the compositions of the invention at levels of from about 0.025% to about 0.2%, preferably from about 0.05% to 0.2%, and most preferably from about 0.05% to about 0.075%.

Surfactant

The surfactants used in the present invention are selected from the group consisting of amine oxides having the following molecular structures:

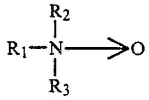

wherein $R_1$ is a $C_8$–$C_{18}$ (preferably $C_{10}$–$C_{16}$) saturated alkyl group; $R_2$ and $R_3$ are $C_1$–$C_{12}$ (preferably $C_1$–$C_3$) saturated alkyl groups.

The surfactants are present in the compositions herein at levels of from about 0.5% to about 2.0%, preferably from about 0.8% to about 1.5%.

Preferred amine oxide compositions from a practical standpoint useful in the practice of the present invention are the commercially available (1) dimethyl "cocoamine" oxide (a mixture which is dominated by dimethyl-$C_{12}$–$C_{16}$ straight chain alkyl amine oxide, more particularly a mixture containing approximately 70% $C_{12}$ straight chain alkyl dimethyl amine oxides, approximately 25% $C_{14}$ of straight chain alkyl dimethyl amine oxides and approximately 4% $C_{16}$ straight chain alkyl dimethyl amine oxides) and (2) N-cocomorpholine oxide, a mixture dominated by $C_{12}$–$C_{16}$ straight chain alkyl morpholine oxides (specifically containing approximately 70% $C_{12}$ straight chain alkyl morpholine oxide, approximately 25% $C_{14}$ straight chain alkyl morpholine oxide and approximately 4% $C_{16}$ straight chain alkyl morpholine oxide). Commercial examples of such amine oxide compositions are: Aromox DMC-W and Aromox DMMC-W which are 30% aqueous dimethyl cocoamine oxide solutions and Aromox NCMDW which is a 40% aqueous N-cocomorpholine oxide solution, each of which is produced by the Armac Division of AKZO of Chicago, Ill. These materials are described in Brochure 68011, published by Armour Industrial Chemicals, Chicago, Ill. 60609. Other preferred amine oxides are n-undecyl dimethyl amine oxide and n-tridecyl dimethyl amine oxide.

Another commercially available amine oxide is Synprolam 35 DMO, a dimethyl-$C_{13}$–$C_{15}$ straight chain amine oxide.

Examples of other suitable amine oxides are disclosed in U.S. Pat. Nos. 3,684,722, Hynam et al., issued Aug. 15, 1972, and 4,390,448, Boden et al., issued June 28, 1983, incorporated herein by reference.

Optionals

Optionally, perfumes can be present in the compositions of the invention at levels of from 0% to about 0.5%, preferably from about 0.05% to about 0.3%. The perfume materials used should, of course, have a high degree of chemical stability to sodium hypochlorite. Some preferred materials for use as perfume ingredients in the compositions herein are patchouli oil, cyclopentadecanolide, p-tertiarybutyl cyclohexyl acetate, tetrahydromycenol, tetrahydrolinalool, phenylacetaldehyde dimethylacetal, methylphenyl carbinol, and mixtures thereof.

Some perfume materials have been found to function as antifoamants for the compositions herein, thereby facilitating processing and high-speed packing of the compositions. Examples of such perfume materials are:

2,6-dimethyloctan-2-ol,
3,7-dimethyloctan-3-ol,
2,6-dimethylheptan-2-ol,
2,4,4-trimethylpentan-2-ol,
2,4,4,6,6-pentamethylheptan-2-ol,
1-methyl-4-isopropylcyclohexan-8-ol,
4-tertiarybutylcyclohexyl acetate,
4-tertiarypentylcyclohexyl acetate,
diethylphthalate,
phenylacetaldehyde dimethyl acetal, and mixtures thereof.

When perfumes are used in the compositions herein they are preferably mixed into the solution of brightener and surfactant prior to the addition of aqueous sodium hypochlorite to the solution.

If perfume usage is toward the upper end of the usage range (i.e., 0.3% to 0.5%) then it is usually necessary to use an amount of surfactant which is also at the higher end of the 0.5% to 2% surfactant usage range hereinbefore disclosed.

Organic oils other than those mentioned under examples of perfume materials can also be used in order to mask the chlorine smell. A preferred organic oil is linear alkylbenzene (LAB) having alkyl chains of from 10 to 14 carbon atoms.

Other dyes can also be added to the compositions if desired.

Composition Preparation

The compositions of the invention can be prepared by first preparing an aqueous solution containing the brightener and the surfactant;

If perfume is to be used in the composition, it is added to the aqueous solution of brightener and surfactant.

For best chemical stability, the compositions herein should have a pH above 12, preferably about 12.5. The pH of the composition should be tested after preparation is complete. If needed, pH adjustment can be made with acid or base (e.g., HCl or NaOH).

The invention will be illustrated by the following example.

EXAMPLE I

| Ingredient | Weight % |
| --- | --- |
| Phorwite CNA | 0.05 |
| Synprolam 35 DMO (100% basis) | 1.0 |
| NaOCl | 5.6 |
| Perfume | 0.15 |
| Balance Water | |

The brightener is dissolved in distilled water, gently heating if required. The surfactant is added with stirring. Then the diluted bleach is added. The brightener is completely dissolved. The composition is visibly clear and surprisingly exhibits UV fluorescence on fabrics washed therein. The composition was stored for several months and UV fluorescence was seen on fabrics washed therein.

What is claimed is:

1. An aqueous composition consisting essentially of:

(a) from about 3% to about 8% sodium hypochlorite;

(b) from about 0.025% to about 0.2% of an optical brightener having the formula:

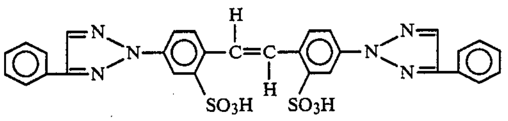

or the salts thereof;

(c) from about 0.5% to about 2% of an amine oxide selected from the group consisting of those having the formula:

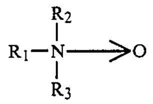

wherein $R_1$ is a $C_8$–$C_{18}$ saturated alkyl group; $R_2$ and $R_3$ are $C_1$–$C_{12}$ saturated alkyl groups.

(d) at least about 80% water;

wherein the amine oxide and brightener are present at a ratio of 40:1 to 10:1; and wherein said composition is a solution which is visibly clear of UV fluorescence and yet exhibits UV fluorescence on fabrics washed therein.

2. The composition of claim 1 additionally comprising up to about 0.5% of a perfume material which is stable against chemical attack by sodium hypochlorite.

3. The composition of claims 1 or 2 wherein the amount of sodium hypochlorite in the finished composition is from about 4% to about 7%.

4. The composition of claims 1 or 2 wherein the amount of optical brightener in the finished composition is from about 0.05% to about 0.2% and said ratio of amine oxide to brightener is 30:1 to 20:1.

5. The composition of claims 1 or 2 wherein the amount of amine oxide in the finished composition is from about 0.8% to about 1.5%.

6. The composition of claims 1 or 2 wherein the amount of optical brightener in the finished composition is from about 0.05% to about 0.075%.

7. The composition of claims 1 or 2 wherein said amine oxide is dimethyl-$C_{13}$–$C_{15}$ straight chain amine oxide.

* * * * *